(No Model.) 2 Sheets—Sheet 1.

W. B. ALTICK.
TWO WHEELED VEHICLE.

No. 395,027. Patented Dec. 25, 1888.

Witnesses,
Geo. A. Lane,
Dan'l H. Herr.

Inventor,
Wm. B. Altick
By his Attorney,
Wm. R. Gerhart (No Model.) 2 Sheets—Sheet 2.

W. B. ALTICK.
TWO WHEELED VEHICLE.

No. 395,027. Patented Dec. 25, 1888.

Witnesses.
Geo. A. Laue
Paul H. Herr.

Inventor.
Wm. B. Altick
By his Attorney
Wm. R. Gerhart

UNITED STATES PATENT OFFICE.

WILLIAM B. ALTICK, OF LANCASTER, PENNSYLVANIA.

TWO-WHEELED VEHICLE.

SPECIFICATION forming part of Letters Patent No. 395,027, dated December 25, 1888.

Application filed July 13, 1888. Serial No. 279,803. (No model.)

*To all whom it may concern:*

Be it known that I, WILLIAM B. ALTICK, a citizen of the United States, residing in Lancaster, in the county of Lancaster and State of Pennsylvania, have invented certain Improvements in Two-Wheeled Vehicles, of which the following is a specification.

My invention relates to improvements in road-carts or two-wheeled vehicles.

It consists, first, in the combination, with a Brewster or other similar spring attached to the thills, of a pivoted foot-board, and braces connecting the foot-board, the spring, and the seat.

It consists, also, of a Brewster or other similar spring attached to the thills, a foot-board pivoted to the splinter-bar of the thills and passing backward above the axle and attached to the seat, and with braces connecting the foot-board, the spring, and the seat.

Figure 1:
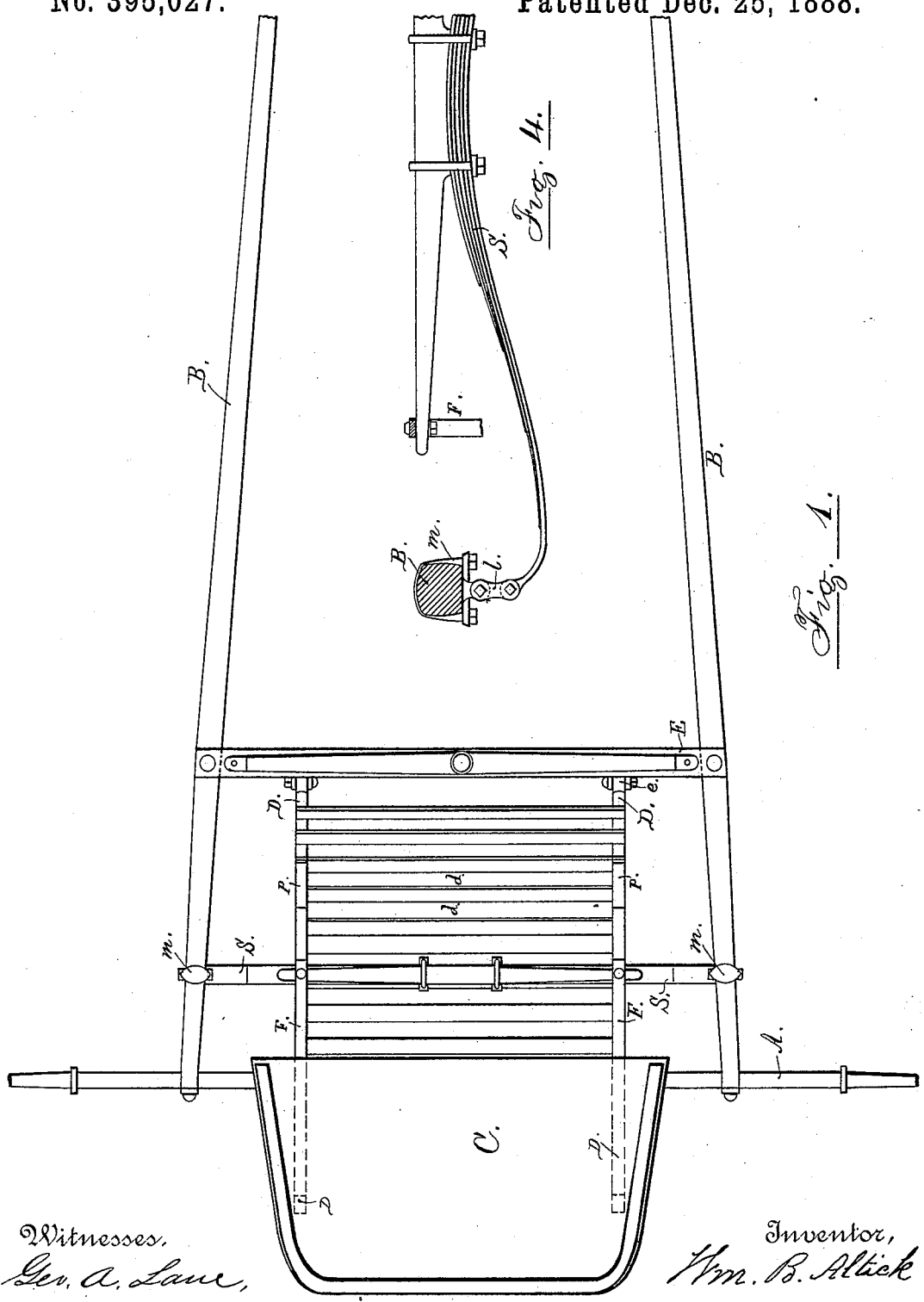
Figure 2:
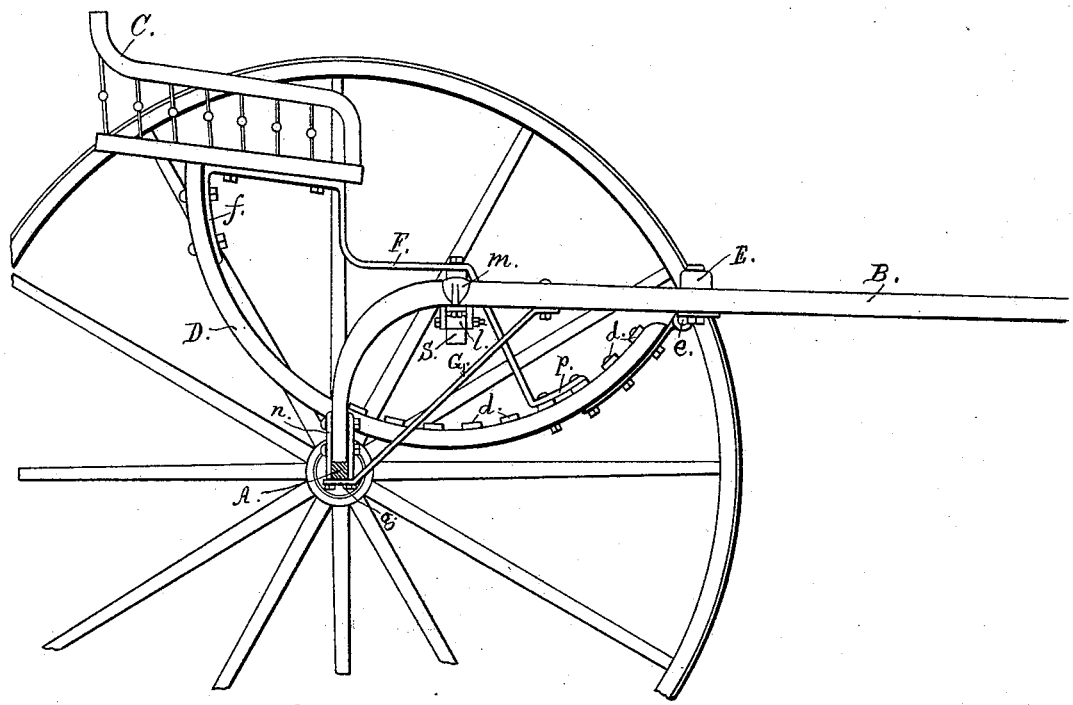
Figure 3:
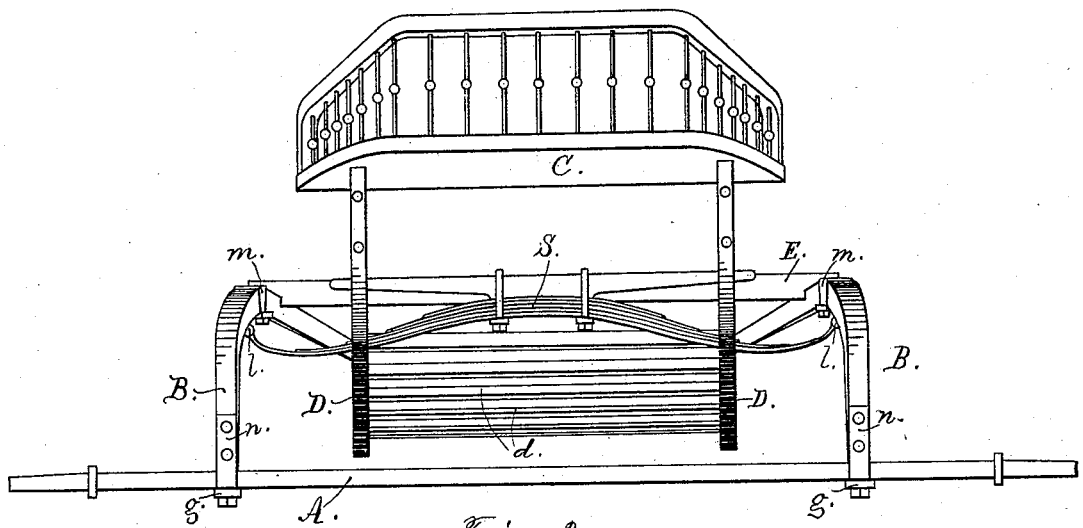

In the accompanying drawings, Figure 1 is a plan view of a two-wheeled vehicle with my improvements applied. Fig. 2 is a side elevation of the same. Fig. 3 is a rear elevation and Fig. 4 an enlarged view showing the manner of connecting the spring with the thills.

A represents the axle of the vehicle; B B, the thills, and C the seat. The platform or foot-board is composed of side bars, D D, and cross-bars $d$. These side bars have the forward ends hinged to the splinter-bar E of the thills at $e$, and thence are carried back, being curved downward until near the axle. They then curve upward, passing above the axle, and the ends are secured to the bottom of the seat by bolts passing through an arm, $f$, of bearing-bars, to be hereinafter described, also fastened to the seat. The thills rise vertically from the axle and then curve abruptly toward the front, the spring S being attached thereto by means of links $l$ and clips $m$ at the forward end of the curve.

F F represent bearing-bars bolted to the foot-board at $p$, which pass backward over the top of the spring, to which they are also bolted, and thence upward, where they are fastened to the bottom of the seat and the side bars, D D. They transmit the weight from the seat to the spring and also serve to brace and hold the various parts together.

This arrangement of the inner ends of the thills, the location of the spring, the foot-board, and bearing-bars F F so balance the load on the vehicle that the weight thrown on the horse is reduced to a minimum. This balance is so well accomplished that when the thills are raised it is as well preserved by the weight of two persons as with that of one. Furthermore, the side bars, D D, pass backward but a couple of inches above the axle, so that if the spring should give way the seat could drop only that distance by reason of those bars coming in contact with the axle, thus avoiding danger of serious accidents to the occupants of the vehicle arising from that cause.

Braces G connect the thills with the axle at $g$ by means of a shoulder passing thereunder and secured to the lower ends of plates $n$, bolted to the front and rear faces of the thills.

Having thus described my invention, what I claim as new, and desire to secure by Letters Patent, is—

1. In a two-wheeled vehicle, the combination, with the thills, of a spring secured to said thills, bearing-bars extending from the spring to the seat, and side bars hinged to the splinter-bar and curving backward over and to the rear of the axle and thence upward to the seat, so that upon the giving way of the spring the said axle may catch and uphold said side bars, substantially as and for the purpose specified.

2. In a two-wheeled vehicle, the combination, with the thills, of a spring attached thereto, and bearing-bars having one end fastened to the foot-board and extending to and connected with the spring and thence passing to the seat, substantially as and for the purpose specified.

3. In a two-wheeled vehicle, the combination, with the thills, a spring connecting said thills, and bearing-bars extending from the spring to the seat, of side bars of the foot-board hinged to the splinter-bar and extending backward beneath said spring to the seat, as and for the purpose specified.

WM. B. ALTICK.

Witnesses:
GEO. A. LANE,
WM. R. GERHARDT.